Feb. 13, 1962  A. G. GRIFFIN  3,021,149
GRIPPING JAWS FOR MATERIALS TESTING MACHINES
Filed Sept. 10, 1959

*INVENTOR*
ALVIN G. GRIFFIN

BY *Green, McCallister & Miller*

*ATTORNEYS*

United States Patent Office 3,021,149
Patented Feb. 13, 1962

3,021,149
GRIPPING JAWS FOR MATERIALS
TESTING MACHINES
Alvin G. Griffin, Blackridge, Pa.
(106 Old Gate Road, Pittsburgh, Pa.)
Filed Sept. 10, 1959, Ser. No. 839,157
5 Claims. (Cl. 279—123)

This invention relates to an improved construction for gripping jaws utilized in materials testing machines, and more particularly to such improved jaws having positively held and easily removable grip inserts.

In the past numerous attempts have been made to provide gripping jaws with removable gripping face inserts, in order to avoid re-cutting the gripping face on a solid unitary block type of gripping jaw. When the gripping surface of the solid block type of grip becomes worn down, it is necessary to disassemble the testing machine and remove the entire gripping block therefrom in order to reform the gripping surface. However, even when the gripping surface is reformed through machining and annealing operations, the internal stresses set up within the block, itself, materially shorten the life of the gripping jaw. In addition, the resurfacing of the gripping face necessitates a cutting away of a portion of the block, and as a result, in order to reuse the block, it is necessary to provide shims in order to compensate for the cutaway material. Because of the difficulty encountered in reforming the gripping face on the solid block type of grip, it is sometimes necessary to completely discard the entire used grip.

The problem of providing economical and durable grips capable of repeated use has been long existent without adequate solution. In some instances, removable inserts were positioned within grooves formed in the gripping blocks or jaws and held therein by means of screws or other fastening means secured therethrough. In order to remove the inserts, it was necessary to completely remove the gripping blocks from the testing machine to get at and remove the screw or other fastening means.

In other instances, removable grip inserts formed from strips of file stock having gripping teeth were inserted longitudinally in a main grip block, and anchored therein by means of set screws, aligning bars, or tiny teeth which bite into the mating surface of the gripping block. Where the strips were anchored at the bottom of the block, they repeatedly failed by cracking very quickly after having been placed in use. In addition, to replace these inserts, it is necessary that the gripping block be removed from the testing machine to facilitate the removal of the set screws or other retaining means.

A further disadvantage which is encountered with the longitudinally-inserted gripping faces, is that since the pull from the test specimen held by the grip is exerted longitudinally of the insertion of the insert in the gripping block, the insert is tightly wedged within the gripping block to prevent it from being pulled out longitudinally therefrom. Accordingly, when the inserts have become worn out and it is necessary to replace them, it is virtually impossible to remove the tightly wedged insert from the block. It has been found that, in order to remove the insert, the entire block must be removed from the machine and the insert pounded out. Such a procedure is not only expensive and time consuming, but also requires a great deal and amount of "down-time" on the testing machine.

My invention has been devised to overcome the problems previously encountered with known types of gripping inserts. In order to avoid the binding or jamming action of the inserts in the wedge blocks, which is encountered when the inserts are inserted longitudinally of the wedge blocks or gripping jaws, I have provided a grip assembly having an insert that is inserted within the gripping jaws transversely of the longitudinal pull exerted on the test specimen. During the development of my improved grip insert, I attempted to retain the insert on the block by providing the back surface of the insert and the complementary surface of the gripping block with interfitting ribs and grooves; however, I found that the insert would not stay in place when the machine was jarred, such as upon the breaking of a test specimen.

I therefore devised a transversely-extending recess on the back surface of my grip insert having a dovetail groove formed along one edge, and a tapered or wedge type surface formed along its opposite edge. The complementary surface of the gripping jaw or wedge block is provided with a transversely-extending flange or rib having a dovetail edge along one side thereof and a tapered or wedge surface along the opposite side thereof. The dovetail edge on both the insert and the block is positioned towards the end of the insert and block which is towards the direction of pull to be exerted by the grip assembly on a test specimen, and the wedge surfaces are positioned toward the ends which are opposite to the direction of such pull. The recess and the flange or rib extend transversely or normal to the direction of pull on the test specimen. The grip insert is easily slidably mounted on the wedge block by a relative sidewise or transverse sliding movement therebetween, normal to the line of pull exerted by the test specimen.

As the insert is inserted transversely across the gripping block, the dovetailed surfaces intermesh with one another and the wedge or tapered surfaces complement one another to securely hold the insert on the gripping block. It is to be noted, however, that since both the intermeshing dovetailed surfaces and the complementary wedge or tapered surfaces lie transversely across the block and accordingly, transversely of the pull exerted on the block by a test specimen, the insert does not become jammed thereon as does a longitudinally-inserted insert.

It thus has been an object of my invention to provide a simple solution to a problem which has heretofore existed in the testing art for a period of several decades;

A further object of my invention has been to provide an improved grip insert which may be easily and quickly removed from or replaced in a grip holder without necessitating the removal of the grip holder from a testing machine;

A further object of my invention has been to provide an improved slide-on grip insert for a gripping block of a materials testing machine, wherein the insert is slid-on the gripping block transversely of the line pull exerted by a test specimen;

An additional object of my invention has been to provide an improved transverse slide-on connecting means for inserting and retaining a grip insert on a gripping block without necessitating additional securing means.

These and other object of my invention will become apparent to those skilled in the art from the following disclosure and accompanying drawings in which.

Figure 1:
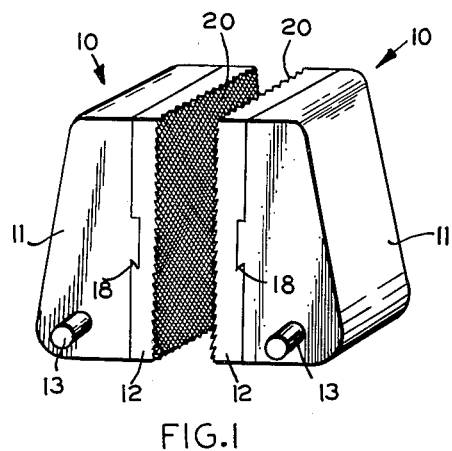
FIGURE 1 is a perspective view of a pair of opposed grip assemblies embodying my improved transverse slide-on grip inserts.

Referring now to the drawings, a pair of opposed grip assemblies 10 are shown, in FIGURE 1, in a position which they may occupy in a materials testing machine. As is well known, two pairs of such testing grips are supported in a materials testing machine with one pair in vertical alignment above the other, such as by a pair of opopsed cross heads. A test specimen is placed between the pairs of grips, and the cross heads are moved away from each other through the application of a loading force. The grip assemblies shown in FIGURE 1 illustrate the position of a bottom pair of machine grips, and the top would be identical therewith, except that they would be in an inverted position. Since the right and left-hand grip assemblies are also identical except for being oppositely disposed, the description of one assembly will suffice for both.

Figure 3:
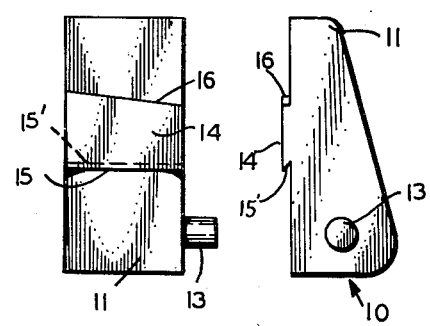
FIGURE 3 is a front elevational view of the left-hand face of the block shown in FIGURE 2.
Figure 2:
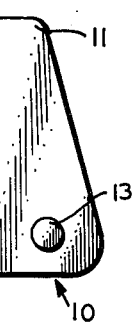
FIGURE 2 is a side elevational view of a grip, jaw, or gripping block illustrating one portion of my improved transverse slide-on connection.

The grip assembly 10 comprises a tapered grip, jaw or gripping block 11 having a grip insert 12. The block 11 is provided with any suitable means, such as a pin 13 extending from one side thereof, for fastening the grip assembly to a materials testing machine. Block 11 has a planar front surface and a tapered back surface. As shown in FIGURES 2 and 3, a projection, flange or rib 14 extends outwardly from the planar front surface. The rib 14 has a dovetailed surface 15 adjacent the thickened or pin end of the block 11. The dovetailed surface 15 is provided with an undercut or groove 15'. The opposite side of the rib 14 is provided with a tapered or wedge surface 16 which tapers outwardly from the pin side of the block 11.

Figure 4:
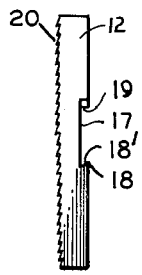
FIGURE 4 is a side elevational view of a grip insert or element illustrating the complementary portions of the transverse slide-on connection.
Figure 5:
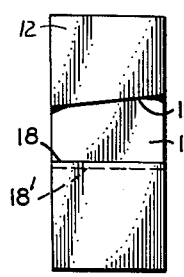
FIGURE 5 is a back elevational view of an insert showing the right-hand face of the insert shown in FIGURE 4.

The insert 12 is preferably made of file stock having any suitable unidirectional teeth or file surface 20 which forms the gripping surface of the insert. As shown in FIGURES 4 and 5, the back surface of the grip insert 12 is provided with a transversely-extending recess or cutout portion 17 having a dovetail surface 18 formed along one edge thereof. The dovetail surface 18 is always formed along the edge of the recess 17 which is toward the end of the insert 12, toward which the unidirectional teeth 20 of the gripping surface are directed. The dovetailed surface 18 has an undercut or groove 18' to receive the dovetail 15 of the block 11 therewithin. The opposite edge of the recess 17 is provided with a tapered or wedge surface 19 to complement the tapered surface 16 of the block 11. The surface 19 is so tapered that the insert 12 can only be positioned on the block 11 with the unidirectional teeth 20 extending downwardly toward the thickened or pin end of the block 11.

Since the pull exerted by the grip inserts on a test specimen held between the grip assemblies will always be from the thin end of the assembly and towards the thickened or pin end thereof, it is imperative that the inserts 12 be correctly positioned on the block 11 with the teeth in a proper orientation. It thus can be seen that by tapering the edge 19 of the recess 17 of insert 12 in a pre-determined direction, such as shown in FIGURE 5, the insert 12 can only be attached to the block 11 in its correct orientation with the teeth 20 extending toward the thickened or pin end of the block 11. An inadvertent positioning of the insert on the block with the teeth in the wrong direction, such as is possible with known types of inserts, is impossible with my improved connecting means.

It should be further noted that not only will the teeth always be in a correct position to operatively bite into a test specimen when longitudinal pull is exerted thereon, but also, the longitudinal pull will not jam or bind the insert in the block in such a manner so as to make it difficult or impossible to remove, such as is occasioned with known types of inserts. Not only are the interfitting dovetail surfaces 15 and 18 held in operable close adjacency by means of the complementary tapered surfaces 16 and 19, but also, since the dovetailed surfaces are positioned adjacent the thickened or pin end of the block 11, they are further urged into cooperable relationship by the pulling force exerted by the test specimen; however, since the dovetailed surfaces 15 and 18 lie transversely of the longitudinal pull of the test specimen, they are not jammed into a binding relationship.

The depth of the recess 17 is produced approximately five ten thousandths of an inch larger than the depth of the rib 14 in order to facilitate the positioning of the rib therewithin. To prevent an over-sliding of the insert on the block and to provide for correct alignment, the small end of the tapered surface 19 is made approximately two thousandths of an inch less than the small end of the tapered surface 16, so that the insert 12 will be correctly positioned on the block 11 with the side edges thereof in complementary alignment.

In practice, when it is desired to remove an insert 12 from a block 11, the insert is merely slid out by hand toward the pin side of the block. The old insert may be quickly replaced by a new insert merely by sliding the new insert on the flange 11 from the pin side of the block. No aligning means or additional retaining means are required to position or retain the insert on the block.

Having thus described my invention, it will be apparent to those skilled in the art that minor changes and modifications may be made hereto without departing from the spirit and scope of the appended claims.

I claim:

1. An improved testing machine grip assembly for material comprising, a gripping block having a longitudinally-extending supporting surface, a removable grip insert having a back surface adapted to complement said supporting surface and a toothed front side for gripping the material, one of said surfaces having a projection extending transversely thereacross, said projection having opposed edges extending transversely across said one surface with one of said edges being undercut and normally intersecting a longitudinal edge of said one surface, the opposite edge of said opposed edges being normal to and extending diagonally across said one surface, the other of said surfaces having a transversely-extending recess formed therein with opposed side edges thereof extending transversely across the said other surface, one of said opposed sides edges being undercut and normally intersecting a longitudinal edge of said other surface, the opposite side edge being normal to and extending diagonally across said other surface, and said transversely-extending projection being adapted to be slid sidewise into said transversely-extending recess to slidably connect and removably secure the grip insert on the gripping block.

2. In a testing machine for material, a grip assembly for the material comprising, a gripping block having a supporting surface extending generally in the lengthwise direction of pull exerted on the material gripped by said grip assembly, a removable materials gripping insert having a back surface adapted to complement said supporting surface and a front side with teeth to grip the material, a wedge-shaped recess formed transversely across one of said surfaces with one side edge thereof being normal to and extending diagonally across said one surface, an opposite side edge of said wedge-shaped recess intersecting said one surface with an acute angle, a wedge-shaped flange formed across the other of said surfaces and having a side edge normal to and extending diagonally across said other surface and an undercut side edge adapted to sidewise slide into said wedge-shaped recess to slidably connect and operatively retain said removable material gripping insert on said block transversely of the direction of pull on the gripped material.

3. In a materials testing machine, an improved grip assembly comprising, a gripping block, said block having a supporting face extending longitudinally of pull exertable on a gripped test specimen, a flange on said supporting face extending transversely thereacross, said flange having a dovetail undercut along one edge thereof which extends transversely across said supporting face and normally intersects a longitudinal edge of said block, an opposite edge of said flange being normal to said supporting face and extending diagonally thereacross, a grip insert having a front gripping surface to grip a test specimen and a back face to complement said supporting face, said back face having a recess extending transversely thereacross, a dovetail undercut formed along one edge of said recess which extends transversely across said back face and normally intersects a longitudinal edge of said insert, an opposite edge of said recess being normal to said back face and extending diagonally thereacross, and said transversely-extending recess being adapted to receive said transversely-extending flange by relative sidewise movement between said insert and said gripping block to thereby removably connect said insert to said gripping block in a sidewise wedging connection which is transverse to the pull exertable on the test specimen.

4. An improved grip assembly as defined in claim 3 wherein said insert is produced from file stock having unidirectional teeth forming the gripping surface thereof, and wherein the biting edge of said teeth and the undercut of said recess extend toward the same end of the insert.

5. An improved grip assembly as defined in claim 4 wherein the tapered recess formed in said insert can only be slid over the tapered flange of said block in one direction so as to properly orient the teeth of said insert on said gripping block.

References Cited in the file of this patent

UNITED STATES PATENTS

| | | |
|---|---|---|
| 1,103,927 | Audibert | July 21, 1914 |
| 1,294,715 | Schultz | Feb. 18, 1919 |
| 1,504,870 | Coughlin | Aug. 12, 1924 |
| 1,715,425 | Parker | June 4, 1929 |
| 2,777,348 | Wraight | Jan. 15, 1957 |